No. 631,541. Patented Aug. 22, 1899.
E. F. HEWITT.
POULTRY COOP.
(Application filed Apr. 19, 1898.)
(No Model.) 2 Sheets—Sheet 1.
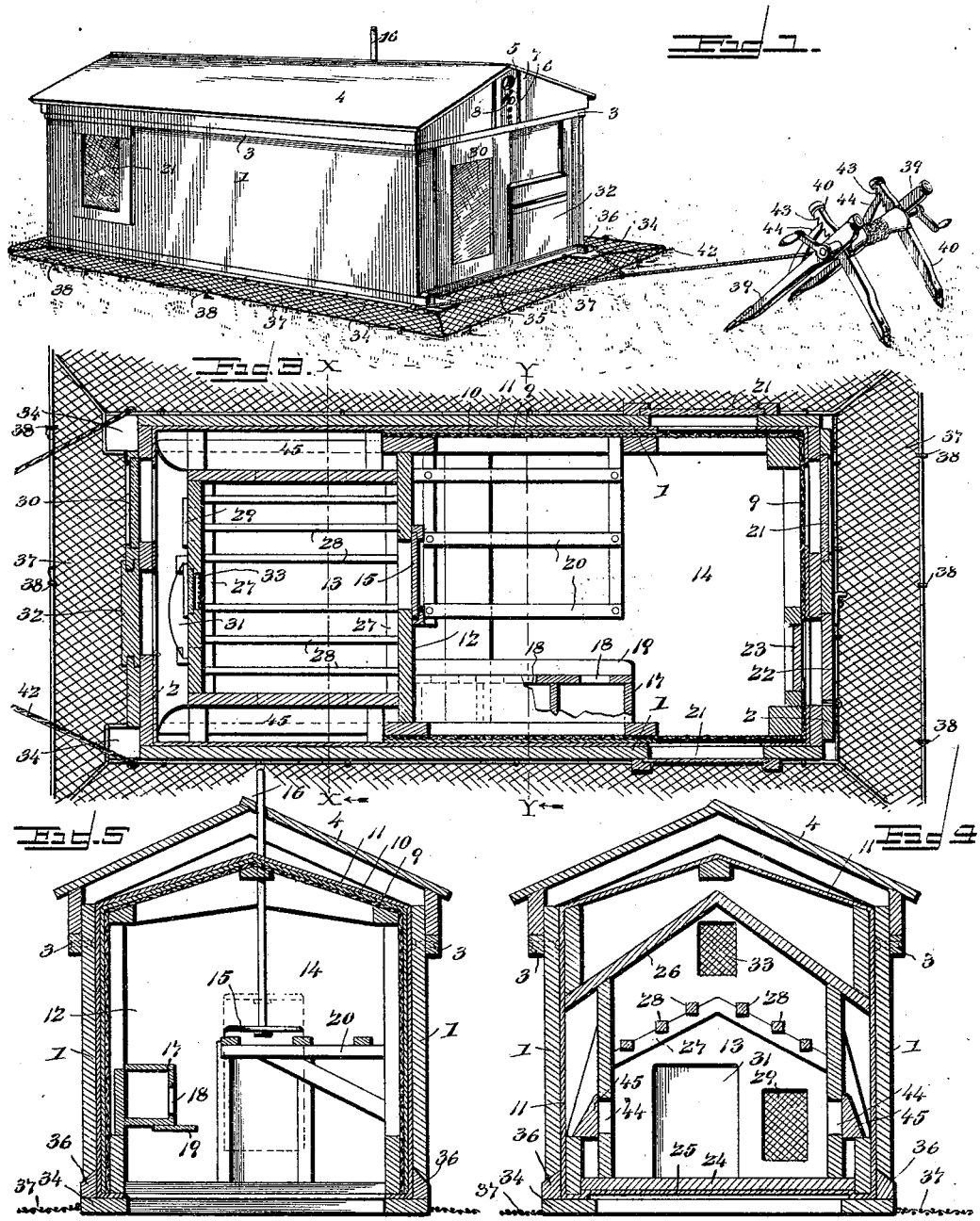
Witnesses
E. F. Stewart
V. B. Hillyard
Elias F. Hewitt, Inventor.
By his Attorneys.
C. A. Snow & Co.
THE NORRIS PETERS CO., PHOTO-LITHO., WASHINGTON, D. C.

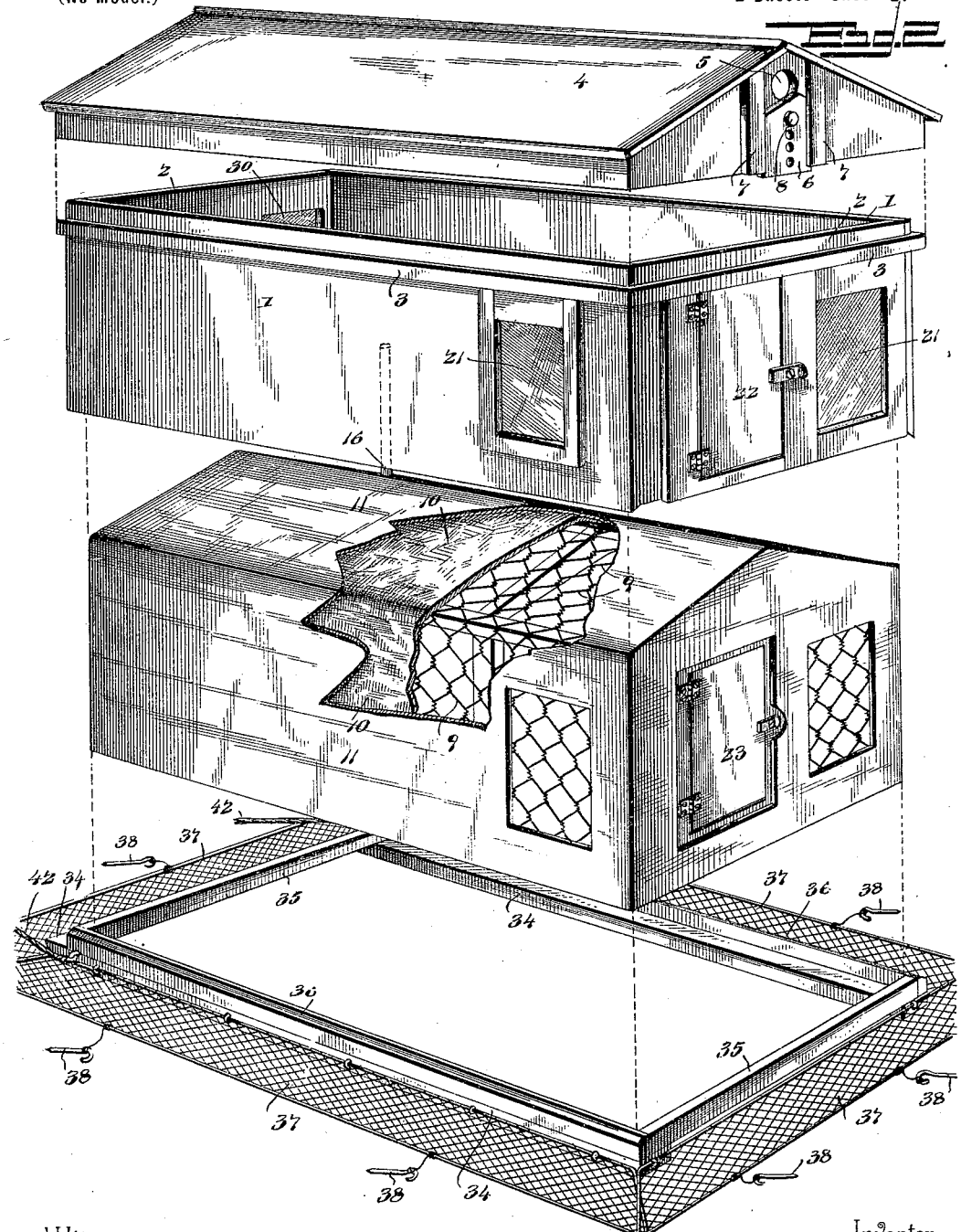

UNITED STATES PATENT OFFICE.

ELIAS F. HEWITT, OF NORTH JACKSON, OHIO.

POULTRY-COOP.

SPECIFICATION forming part of Letters Patent No. 631,541, dated August 22, 1899.

Application filed April 19, 1898. Serial No. 678,183. (No model.)

*To all whom it may concern:*

Be it known that I, ELIAS F. HEWITT, a citizen of the United States, residing at North Jackson, in the county of Mahoning and State of Ohio, have invented a new and useful Poultry-Coop, of which the following is a specification.

The purpose of the present invention is the provision of a structure which can be used for raising poultry and small stock and housing and protecting them at all seasons of the year and which during cold weather will afford ample protection and during warm weather secure the necessary ventilation in order to maintain the poultry or stock in a healthy condition. The device is of a portable character, and the greater part of its bottom is exposed, thereby permitting the poultry or stock to feed upon grass and have access to the earth, the structure being shifted from time to time so as to bring it over a new spot of grass or earth, thereby securing to the poultry or stock all the advantages of being at large although confined.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of a structure embodying the principal features of this invention and showing the means for moving it from place to place. Fig. 2 is a perspective view of the coop, the component parts being separated and arranged in vertical relation and the inner structure having parts of its protecting-covering broken away. Fig. 3 is a detail plan section. Fig. 4 is a transverse section of the complete structure on the line X X of Fig. 3, looking in the direction of the arrow. Fig. 5 is a transverse section on the line Y Y of Fig. 3, looking in the direction of the arrow.

Corresponding and like parts are referred to in the following description and indicated in the several views of the drawings by the same reference characters.

The device comprises in its construction an inner and an outer framework, the inner framework being of skeleton form and the outer framework constituting a housing therefor and being formed of sides 1 and ends 2, which are rigidly and firmly connected at their meeting ends or corners. A strip 3 is secured to the sides and ends a short distance from their upper edges and provides a support for the roof 4, which is detachably fitted to the body of the outer frame, so as to be removed in warm weather to secure the required ventilation. An air-space is formed between the roof and the top of the inner or skeleton structure and materially assists in protecting against the cold in fall and winter seasons.

The roof comprises end and side pieces, intermediate ribs, and outer boards, and its end pieces have openings 5, which are adapted to be closed or regulated by sliding doors 6, mounted in vertical guides 7, said doors being adjustable and held in any desired position by means of pins 8 passing through one of a series of openings in the doors and entering a corresponding opening in the end pieces of the roof structure.

The inner or skeleton structure is removably fitted within the outer frame and is composed of corresponding longitudinal and transverse bars connected by vertical posts or uprights. This inner structure is removably fitted within the outer frame, so as to be detached and used independently thereof in warm weather, it also being contemplated to utilize the outer frame as a pen or inclosing structure. The skeleton frame is covered with wire-netting 9 to protect the poultry or stock from the inroads of rats, weasels, and like animals, which are destructive to poultry. A portion of the skeleton structure, preferably the middle part, is further covered by canvas, duck, or like material 10 to secure additional protection against cold. Felt or heavy paper 11 extends over the covering of wire-netting and incloses the inner structure at its top, ends, and sides and is designed to exclude drafts of air and the cold in the winter season and to render the poultry or stock comfortable. The covering of canvas and felt may be omitted in warm weather, so as to admit of a free circulation of air.

A vertical partition 12 divides the inner structure into two compartments, the compartment 13 being designed chiefly for roosting purposes and the compartment 14 for feeding and exercising. A vertically-sliding door 15 controls a door-opening in the partition 12 and admits of the poultry passing from one compartment to the other. This door is operated by means of a stem 16, passing vertically through the roofs of the inner and outer structures. When it is desired to permit the young chickens or brood to pass from the compartment 13 into the compartment 14 and confine the mother hen in the roosting-compartment, the door 15 is opened just enough to permit of the passage of the young chickens beneath it and through the door-opening.

A comparatively long box 17 is secured to one side or wall of the feeding-compartment and is subdivided by vertical partitions into a number of compartments forming nests, access being had to the several nests or compartments through openings 18 in the inner wall of the box. A foot-board 19 is secured to the bottom side of the box and projects from the inner wall thereof and provides a rest for the poultry when entering and leaving the nests. A rack 20 projects inwardly from the opposite wall or side of the feeding-compartment and provides a roost for the fowl when inclining to perch. Windows 21 are provided in the outer end and sides of the feeding-compartment and register with corresponding windows in the end and sides of the outer framework, the window-openings in the outer framework being protected by glass, so as to exclude the cold and yet admit of light and sunshine into the feeding-compartment. A door 22 is provided in the outer end of the feeding-compartment and admits of access being had thereto. A corresponding door 23 is had in the adjacent end of the outer frame, thereby providing for ingress and egress to and from the feeding-compartment when required. The feeding-compartment is entirely open at the bottom, so as to admit of the poultry or stock feeding upon grass and having free access to the ground inclosed by the walls of said compartment. By changing the position of the coop or device from time to time fresh grass and earth are secured and provided for the poultry.

The roosting-compartment 13 is closed in at its bottom, top, and sides to prevent freezing of the fowl in cold weather. The bottom 24 is slightly elevated and is rendered frost-proof by having felt or like material 25 secured to its bottom side. The top 26 is lower than the roof or top of the inner structure, and an air-space is formed between the two, thereby securing additional protection from the cold. Strips 27 are secured to the inner and outer walls of the compartment 13 and incline outwardly and downwardly from their inner or upper ends and are formed with a series of notches in their upper edges, in which are fitted bars 28, upon which the fowl roost. A window 29 is provided in the outer end wall of the compartment 13 and admits light into the said compartment. This window is protected by wire-netting and glass, the latter being omitted in warm weather. A window 30 is located in the end of the outer frame, contiguous to the window 29, to provide for the admission of light therethrough. A sliding door 31, movable in guideways, controls an opening in the outer end wall of the roosting-compartment and can be opened more or less to admit of the young chickens passing out from the roosting-compartment and retain the larger fowl. A sliding door 32 is provided in the end of the outer frame, opposite the sliding door 31, for the ingress and egress of the poultry. As clearly indicated, a space exists between the outer ends of the roosting-compartment 13 and the frame inclosing the skeleton structure, and the several windows and doors open into this space. An upper window 33 is located in the upper portion of the end wall of the compartment 13 and admits light thereto and in warm weather affords ventilation.

In order that the structure may be readily shifted, it is mounted upon runners 34, which are connected at their ends by cross-bars 35 and are provided at their sides with strips 36, which embrace the sides of the outer frame and in conjunction with the cross-bars 35 hold the parts in place when fitted together. These runners are detachable, so as to be used in connection with either the inner or outer frames or structures. The lower edges of the sides 1 are beveled, and the upper edges of the strips 36 are correspondingly beveled, so as to shed water and prevent the same entering between the sides 1 and strips 36. In order to exclude burrowing animals from gaining access to the interior of the structure, wire-netting 37 in strips of suitable width is secured to the runners and cross-bars of the runner-frame and projects outwardly therefrom and is secured at its outer edge to the ground by hooked pins 38, driven into the ground and having their hooked ends engaged with the outer edge of the said wire-netting.

Any suitable means may be provided for shifting the coop or structure when required; but it is preferred to have recourse to the apparatus illustrated, which consists of pairs of legs 39 and 40 and a windlass 41, pivotally connecting the legs a short distance from their upper ends and having cranks at its extremities, by means of which the windlass is turned so as to wind thereon the rope or cord 42, connected with the runner-frame and by means of which the same is drawn over the ground when operating the windlass in a direction to wind the rope or cord thereon. The legs 39 are considerably longer than the legs 40 and incline in a direction so as to sustain and brace the apparatus when in operation. The short legs 40 have a series of teeth 43 at their upper ends which are adapted to be engaged by pawls or dogs 44, having pivotal connection with the long legs 39, so as to hold two sets of legs in an adjusted position. The lower ends of the legs are provided with pointed irons bolted or otherwise rigidly attached thereto and which are driven into the ground when the apparatus is set up for operation.

In cold weather the structure will be assembled and utilized in the manner herein described; but in warm weather the inner structure will be removed from the outer frame and the clothing or covering of canvas and felt will be removed and both the inner and the outer structure or frame will be used separately. Openings 44 are formed in the side walls of the roosting-compartment and are closed by doors 45. In warm weather the young chickens can have free ingress and egress to the openings 44 when the inner structure is removed from the outer frame.

Having thus described the invention, what is claimed as new, and desired to be secured by Letters Patent, is—

1. A device for raising and housing poultry and the like, consisting of inner and outer structures detachably fitted together and provided with corresponding windows and doors, a roof removably fitted to the outer framework and affording protection to the inner structure, and a runner-frame supporting both of the structures and adapted for independent use for either, substantially as set forth.

2. In a device for raising and housing poultry and the like, the combination of an outer framework, an inner framework of skeleton form removably fitted within the outer framework, corresponding windows and doors in the two structures, a wire-netting inclosing the skeleton structure, and a covering placed over the wire-netting, substantially as set forth.

3. In a device for raising and housing poultry and the like, the combination of inner and outer structures detachably fitted together, a runner-frame supporting both of the structures, and adapted for independent use for either, and means for moving the device from place to place, substantially as and for the purpose set forth.

4. In a device for raising and housing poultry and the like, the combination of inner and outer structures removably fitted together, the outer structure having the lower edges of its sides beveled, runners, cross-bars connecting the runners at their ends, and side strips secured to the runners and embracing the sides of the structure and having their upper edges beveled to correspond with the lower beveled edges of the outer structure, substantially as set forth.

5. The herein-described means for raising and housing poultry and the like, consisting of a runner-frame, wire guards secured to the runner-frame and adapted to be made fast at their outer edges to the ground, inner and outer structures provided with corresponding windows and doors removably placed together, the inner structure being a skeleton framework covered by wire-netting and felt or like material, said inner structure having a roosting-compartment therein closed at its bottom, top and sides, a sliding door controlling the communication between the two compartments, a nest and a rack located in the feeding-compartment which latter has its bottom open, a roof removably fitted to the outer structure and having openings in its ends controlled by sliding doors, and means for moving the runner-frame, substantially as set forth.

6. In a device for raising and housing poultry and the like, the combination of inner and outer structures having corresponding doors and windows, the inner structure being divided into a roosting-compartment and a feeding and exercising compartment, the former compartment being closed upon all sides and having an air-space formed between it and the outer structure upon opposite sides and at the outer end of the compartment, the doors and windows at the roosting end of the outer structure opening into the air-space, whereby the roosting-compartment is protected against the action of the exterior air, substantially as shown and described.

In testimony that I claim the foregoing as my own I have hereto affixed my signature in the presence of two witnesses.

ELIAS F. HEWITT.

Witnesses:
  A. E. LYNN,
  H. H. LYNN.